United States Patent

Naselli et al.

[11] Patent Number: 5,125,064
[45] Date of Patent: Jun. 23, 1992

[54] OPTICAL SYSTEM USING FIBER OPTIC ELEMENT FOR FIELD CURVATURE REVERSAL

[75] Inventors: Charles Naselli; Earle N. Phillips, both of Roanoke; Albert F. Tien, Salem, all of Va.

[73] Assignee: ITT Corporation, New York, N.Y.

[21] Appl. No.: 689,369

[22] Filed: Apr. 22, 1991

[51] Int. Cl.[5] .............................................. G02B 9/12
[52] U.S. Cl. ................................ 385/116; 359/648; 385/33
[58] Field of Search ............... 350/96.15, 96.18, 96.25, 350/412; 359/648, 649, 651; 385/31, 33, 34, 116, 120

[56] References Cited

U.S. PATENT DOCUMENTS 3,033,071  5/1962  Hicks, Jr. ..................... 350/412 X
3,101,472  8/1963  Goubau ....................... 350/96.18 X
5,029,963  7/1991  Naselli et al. ................. 350/96.18

Primary Examiner—John D. Lee
Attorney, Agent, or Firm—Arthur L. Plevy; Patrick M. Hogan

[57] ABSTRACT

A fiber optic elment is used to correct or reverse a field curvature distortion in an optical system having two imaging elements. The fiber optic element has fibers arranged in parallel with their first ends along a curvature corresponding to the expected field curvature of the image from the first imaging element, and second ends along another curvature for producing a correct output image. In the two-element optical system, the fiber optic array has its second ends arranged to provide an input object to the second imaging element with a reversed field curvature such that a correct output image is obtained from the second imaging element.

5 Claims, 3 Drawing Sheets

FIG-1 UNCORRECTED SYSTEM
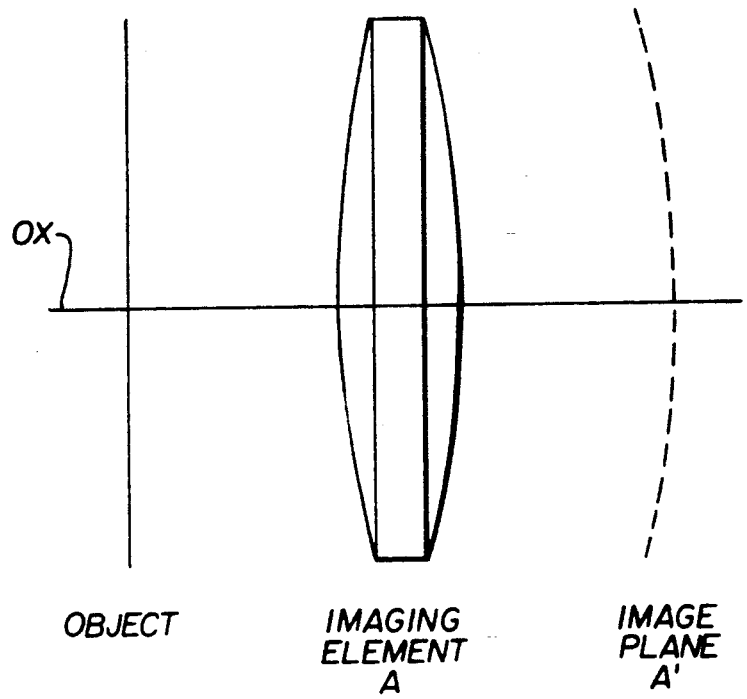
OBJECT  IMAGING ELEMENT A  IMAGE PLANE A'
FIG-2 CORRECTED SYSTEM
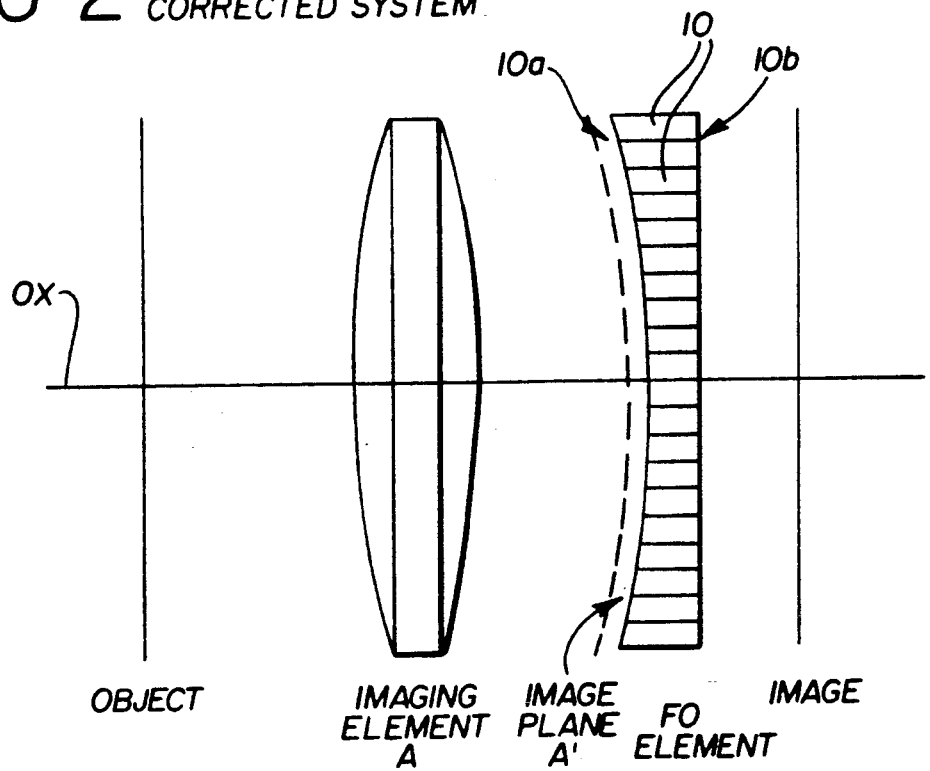
OBJECT  IMAGING ELEMENT A  IMAGE PLANE A'  FO ELEMENT  IMAGE

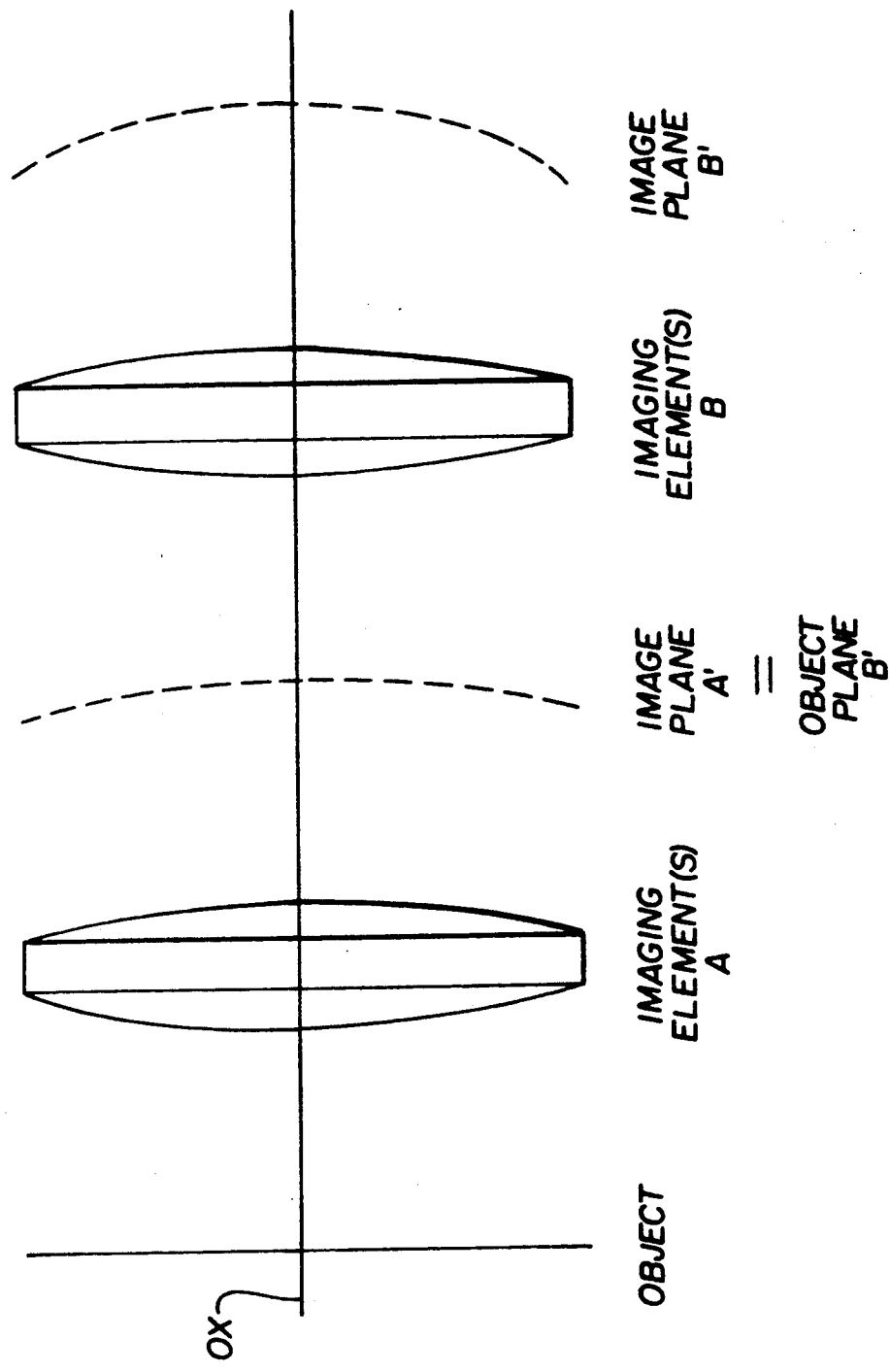

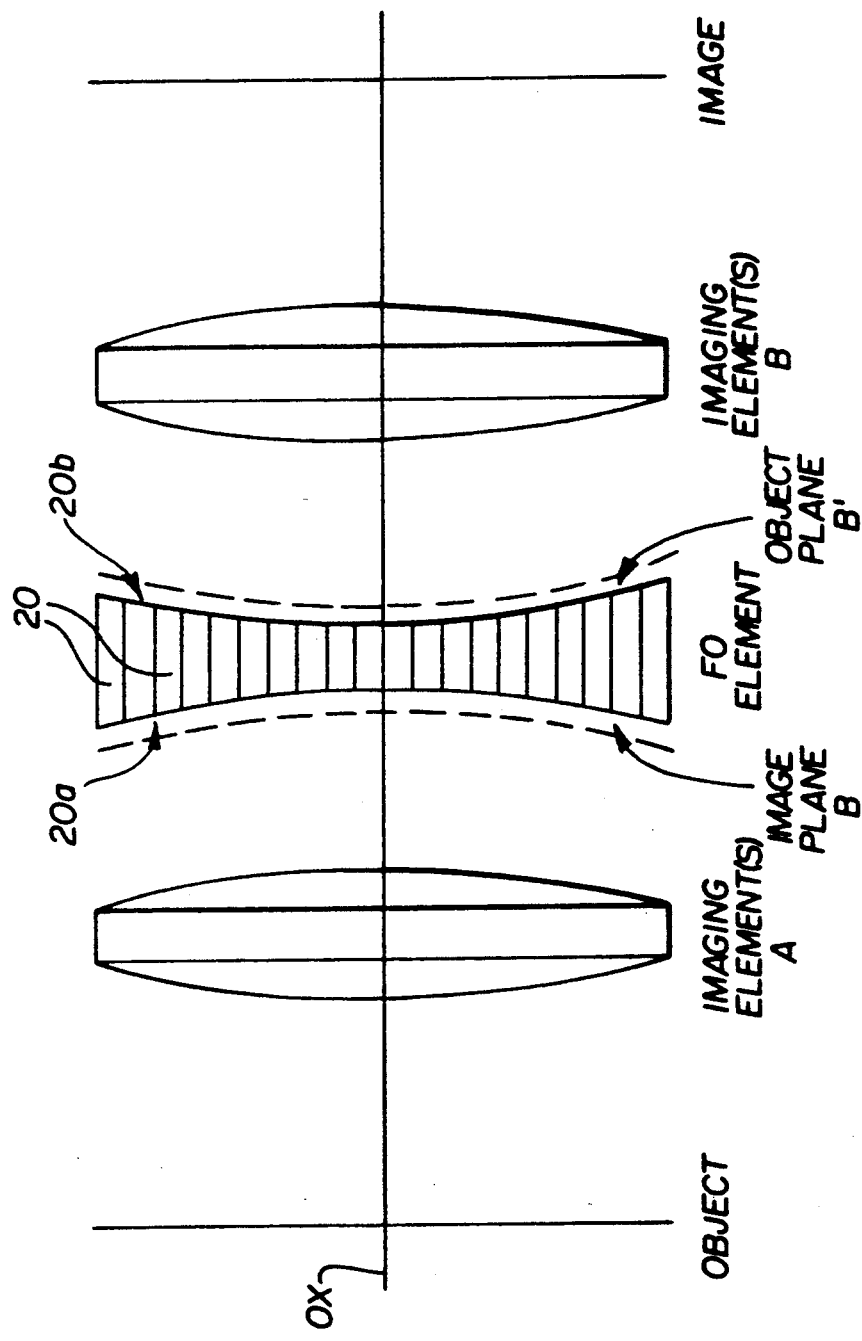
FIG-4 CORRECTED SYSTEM

5,125,064

OPTICAL SYSTEM USING FIBER OPTIC ELEMENT FOR FIELD CURVATURE REVERSAL

FIELD OF INVENTION

The present invention relates to an optical system having an imaging element, and particularly, to a system in which an image from one imaging element provides an object for a second imaging element.

BACKGROUND OF INVENTION

In many optical systems, an imaging or image converter element, such as a lens or image tube, is used to convert light received from an object into a focused, magnified, or amplified image as required for desired optical applications. However, transmission through the imaging element often results in a field curvature in the output image that must be corrected. For example, in the uncorrected system of FIG. 1, transmission of light from an object along an optical axis OX through an imaging element A is shown to have a curvature distortion in the output image plane A'. For simplicity, imaging element A is shown and referred to as a single lens; generally, it can be an optical system of arbitrary complexity.

Furthermore, some optical systems have two or more imaging elements (again, of arbitrary complexity) in which an image from one imaging element provides an object for a second imaging element. As shown in the uncorrected system of FIG. 3, an image plane A' is output from the imaging element A with a curvature distortion, and becomes the input object to a second imaging element B, resulting in a further distorted, output image plane B'. The compounded distortion effects can render the resulting image in poor quality or unsatisfactory condition for the desired optical application.

Merely inserting the fiber optic element FO of FIG. 2 between the imaging elements A and B would not prevent the curvature distortion at the output image plane B' due to imaging element B. This is because the flat plane of the fiber optic element FO would not adequately compensate for the differences in lens radii or curvature, for example, of the different imaging elements A and B.

Efforts to correct field curvature distortions of optical systems have generally been accomplished by the addition of corrective elements, such as a field-flattening lens. However, the additional corrective elements add to the cost, weight, and volume of such systems, and can introduce unwanted other effects into the optical system, such as internal reflection, depth of field alteration, or refraction. Moreover, in compound systems where a reversal of the field curvature of the image plane from the first imaging element is desired prior to entry through the second imaging element in order to minimize complication of the second imaging element and to yield a correct output image, the field-flattening lens does not provide an adequate solution.

It is therefore a principal object of the invention to provide an optical system having means for correcting a field curvature in an image transmitted through an imaging element. It is a further object to provide such means which will reverse the field curvature of an image so that it can be transmitted through a second imaging element and result in a correct output image. In particular, the invention seeks to provide for field curvature correction which does not introduce unwanted other effects into the optical system.

SUMMARY OF INVENTION

An optical system comprising first and second imaging elements for receiving light from an object along an optical axis of said optical system and transmitting the light therethrough as an output image, and field curvature correction means along the optical axis including a fiber optic element arranged between said first and second imaging elements and having an array of optical fibers arranged in parallel with each other and the optical axis of the optical system, said array of optical fibers having first ends facing toward said first imaging element and being arranged along a first curvature corresponding to an expected field curvature of the output image from said first imaging element, and having second ends facing away from said first imaging element and being arranged along a second curvature which is a reverse curvature of an expected field curvature attributable to said second imaging element, such that a correct output image is obtained from said second imaging element and thus for the entire system.

BRIEF DESCRIPTION OF DRAWINGS

The above objects and further features and advantages of the invention are described in detail below in conjunction with the drawings, of which:

FIG. 1 is a diagram of a known optical system having one imaging element from which an output image is obtained with a curvature distortion;

FIG. 2 is a diagram of the known single-element optical system having a fiber optic element for producing an output image without the curvature distortion;

FIG. 3 is a diagram of a known optical system having two imaging elements from which an output image is obtained with a compounded curvature distortion;

FIG. 4 is a diagram of the two-element optical system having a fiber optic element of the present invention for reversing the field curvature so that an output image is obtained without a curvature distortion.

DETAILED DESCRIPTION OF THE PREFERRED EMBODIMENT

Referring to FIG. 4, an optical system in accordance with the invention comprises two imaging elements A and B for receiving light from an object along an optical axis OX and transmitting the light therethrough as an output image A' and B', and field curvature correction means in the form of a fiber optic element FO. The imaging elements A and B may be lenses, image tubes, or other light-transmitting devices typically used for focusing, magnifying, amplifying, etc. a light image. The image plane A' after transmission through the imaging element A has an expected field curvature or other distortion attributable to the geometry or light-transmitting properties of the element A. The fiber optic element FO is an array of optical fibers 20 arranged in parallel with each other and with the optical axis OX of the optical system, and is used to correct the field curvature or other distortion of the image plane A'. The fibers 20 of the fiber optic element FO have their first ends on the side 20a arranged along a curvature corresponding to the expected field curvature of the output image plane A', and their second ends on the side 20b arranged along another curvature corresponding to the reverse of the expected field curvature imparted to an object upon transmission through imaging element B.

The result of the fiber optic element FO with sides 20a and 20b is that the output object plane B' is provided with a reverse field curvature such that a correct output image (lacking curvature distortion) is obtained from the second imaging element B. In a symmetrical system wherein imaging elements A and B are the same, the reverse field curvature of the object plane B' is the opposite of the field curvature of the image plane A'. The invention can also be applied to asymmetrical systems, as well to imaging elements requiring opposite (convex) fiber optic curvature(s).

In contrast to the present invention, the fiber optic element FO in FIG. 2 has fibers 10 with their first ends on the side 10a facing toward the imaging element A and arranged along a curvature corresponding to the expected field curvature of the output image plane A' from the imaging element A. However, the fibers have their opposite, second ends facing away from the imaging element A on the side 10b arranged along a flat plane. Even though it is a characteristic of the fiber optic element FO that the thus-configured sides 10a and 10b have an image-flattening effect, such that light transmitted therethrough is output as a correct image of the initial object, the image-flattening effect would not be obtained if this fiber optic element FO were to be used in a system similar to that shown in FIG. 4. That is, the fiber optic element FO in FIG. 2 is insufficiently formed for use in a symmetrical or asymmetrical optical system, having two imaging elements A and B, to produce an output image that lacks curvature distortion.

The fiber optic element of the invention can be fabricated or purchased from many sources such as from Schott Fiber Optics, Inc. of Southbridge, Mass. The invention enhances the quality of the output image and reduces, if not eliminates, the curvature distortion which may occur with these and other devices.

An example of a system having imaging elements that are combined with fiber optic elements is that system disclosed in U.S. application Ser. No. 07/480,433, filed Feb. 15, 1990, entitled "Replacement Device for a Driver's Viewer" by Charles Naselli and Albert F. Tien, two of the inventors herein and assigned to the assignee herein, and having been allowed, that application having two of the same inventors named herein and the same assignee as the present application.

The specific embodiment of the invention described herein is intended to be illustrative only, and many other variations and modifications may be made thereto in accordance with the principles of the invention. All such embodiments and variations and modifications thereof are considered to be within the scope of the invention, as defined in the following claims.

We claim:

1. An optical system comprising:
   first and second imaging elements for receiving light from an object along an optical axis of said optical system and transmitting the light therethrough as an output image, and
   field curvature correction means along the optical axis including a fiber optic element arranged between said first and second imaging elements and having an array of optical fibers arranged in parallel with each other and the optical axis of the optical system, said array of optical fibers having first ends facing toward said first imaging element and being arranged along a first curvature corresponding to an expected field curvature of the output image from said first imaging element, and having second ends facing away from said first imaging element and being arranged along a second curvature which is a reverse curvature of an expected field curvature attributable to said second imaging element, such that a correct output image is obtained from said second imaging element, and thus for the entire system.

2. An optical system according to claim 1, wherein said first and second imaging elements provide the same field curvature to an image plane transmitted therethrough, and said second curvature of said fiber optic element is the reverse of said first curvature.

3. An optical system comprising:
   a first imaging element for receiving light from an object along an optical axis of said optical system and transmitting the light therethrough as an output image,
   field curvature correction means along the optical axis including a fiber optic element having an array of optical fibers arranged in parallel with each other and the optical axis of the optical system, said array of optical fibers having first ends facing toward said first imaging element and being arranged along a first curvature corresponding to an expected field curvature of the output image from said first imaging element, and having second ends facing away from said first imaging element and being arranged along a second curvature, and
   a second imaging element along the optical axis facing said second ends of the fibers of said fiber optic element for receiving an output image from said fiber optic element and transmitting the light therethrough as an output image,
   wherein said fibers of said fiber optic element have their second ends arranged along a second curvature which is a reverse curvature of an expected field curvature attributable to said second imaging element, such that a correct output image is obtained from said second imaging element, and thus for the entire system.

4. An optical system according to claim 3, wherein said two imaging elements provide the same field curvature to an image plane transmitted therethrough, and said second curvature of said fiber optic element is the reverse of said first curvature.

5. The optical system according to claim 4 wherein said first imaging element, said field curvature correction means and said second imaging element extend substantially the same distance above and below said optical axis.

* * * * *